United States Patent
Cobianu et al.

(10) Patent No.: US 8,384,524 B2
(45) Date of Patent: Feb. 26, 2013

(54) PASSIVE SURFACE ACOUSTIC WAVE SENSING SYSTEM

(75) Inventors: Cornel Cobianu, Bucharest (RO); Ion Georgescu, Bucharest (RO); Cazimir Bostan, Bucharest (RO)

(73) Assignee: Honeywell International Inc., Morristown, NJ (US)

( * ) Notice: Subject to any disclaimer, the term of this patent is extended or adjusted under 35 U.S.C. 154(b) by 480 days.

(21) Appl. No.: 12/626,407

(22) Filed: Nov. 25, 2009

(65) Prior Publication Data

US 2010/0127834 A1    May 27, 2010

Related U.S. Application Data

(60) Provisional application No. 61/118,390, filed on Nov. 26, 2008.

(51) Int. Cl.
    *H04Q 5/22*    (2006.01)
(52) U.S. Cl. ............ 340/10.1; 340/10.2; 340/10.3; 340/10.4; 340/10.5; 340/5.1; 340/5.2; 340/5.3; 340/5.4; 340/5.5; 340/572.1; 340/572.2; 340/572.3; 340/572.4; 340/572.9; 235/375; 235/376; 235/377; 235/384; 235/385
(58) Field of Classification Search ............ 340/5.1–5.5, 340/10.1–10.5, 572.1–572.9; 235/375–385
    See application file for complete search history.

(56) References Cited

U.S. PATENT DOCUMENTS

| | | | |
|---|---|---|---|
| 4,100,811 A | 7/1978 | Cullen et al. | |
| 4,295,102 A | 10/1981 | Schmidt et al. | |
| 4,332,342 A | 6/1982 | van Der Put | |
| 4,598,587 A | 7/1986 | Dwyer et al. | |
| 4,621,530 A | 11/1986 | Dwyer et al. | |
| 5,821,425 A | 10/1998 | Mariani et al. | |
| 5,836,187 A | 11/1998 | Janssen et al. | |
| 6,003,378 A | 12/1999 | Scherr et al. | |
| 6,335,667 B1 | 1/2002 | Takagi et al. | |
| 6,442,985 B1 | 9/2002 | Watanuki et al. | |
| 6,553,836 B2 | 4/2003 | Williams | |
| 6,726,099 B2 | 4/2004 | Becker et al. | |
| 6,758,089 B2 | 7/2004 | Breed et al. | |

(Continued)

FOREIGN PATENT DOCUMENTS

| DE | 10215834 | 11/2003 |
|---|---|---|
| FR | 2755791 | 5/1998 |

(Continued)

OTHER PUBLICATIONS

Benes et al., "Comparison between BAW and SAW Sensor Principles," IEEE International Frequency Control Symposium, pp. 5-20, 1997.

(Continued)

*Primary Examiner* — George Bugg
*Assistant Examiner* — Ojiako Nwugo
(74) *Attorney, Agent, or Firm* — Seager Tufte & Wickhem LLC

(57) ABSTRACT

The present disclosure relates generally to wireless detection systems. In one illustrative embodiment, a wireless detection system includes a plurality of surface acoustic wave (SAW) sensors, and an electronic reader for interrogating the plurality of SAW sensors. In some instances, each of the surface acoustic wave based sensors includes an integrated sensor coil. The electronic reader may include a plurality of reader coils and a controller. The controller may be configured to interrogate the plurality of surface acoustic wave based sensors using a time division interrogation. In some cases, each of the plurality of reader coils is inductively coupled to only one of the integrated coils of the SAW sensors at any given time.

20 Claims, 5 Drawing Sheets

U.S. PATENT DOCUMENTS

| | | | |
|---|---|---|---|
| 6,927,692 B1* | 8/2005 | Petrinovic | 340/572.1 |
| 7,082,835 B2 | 8/2006 | Cook et al. | |
| 7,096,736 B2 | 8/2006 | Pfeifer et al. | |
| 7,100,451 B2 | 9/2006 | Solie | |
| 7,109,632 B2 | 9/2006 | van Knokke | |
| 7,129,828 B2 | 10/2006 | Cook | |
| 7,136,683 B2 | 11/2006 | Eisenhower, Jr. et al. | |
| 7,165,298 B2 | 1/2007 | Ehlers et al. | |
| 7,239,229 B2 | 7/2007 | Bauhahn | |
| 7,243,547 B2 | 7/2007 | Cobianu et al. | |
| 7,391,325 B2 | 6/2008 | Cobianu et al. | |
| 7,573,370 B2 | 8/2009 | Becker et al. | |
| 7,576,470 B2 | 8/2009 | Kumar et al. | |
| 7,636,031 B2 | 12/2009 | Mirmobin et al. | |
| 7,696,878 B2 | 4/2010 | Cable et al. | |
| 7,730,772 B2 | 6/2010 | Cook et al. | |
| 2003/0169148 A1 | 9/2003 | Takamura et al. | |
| 2004/0046642 A1 | 3/2004 | Becker et al. | |
| 2004/0159135 A1 | 8/2004 | Kato et al. | |
| 2005/0151599 A1 | 7/2005 | Ido et al. | |
| 2006/0106561 A1* | 5/2006 | Thiesen | 702/104 |
| 2006/0179918 A1 | 8/2006 | Liu | |
| 2006/0238078 A1 | 10/2006 | Liu | |
| 2007/0222609 A1* | 9/2007 | Duron et al. | 340/572.7 |
| 2010/0013598 A1* | 1/2010 | Greene | 340/10.1 |
| 2010/0013599 A1 | 1/2010 | Tartock et al. | |

FOREIGN PATENT DOCUMENTS

| | | |
|---|---|---|
| WO | 0220287 | 3/2002 |
| WO | 0231461 | 4/2002 |
| WO | 03078950 | 9/2003 |
| WO | 03081195 | 10/2003 |
| WO | 2006073525 | 7/2006 |

OTHER PUBLICATIONS

Buff, et al., "Passive Remote Sensing for Temperature and Pressure Using SAW Resonator Devices," IEEE Transactions on Ultrasonics, Ferroelectrics, and Frequency Control, vol. 45, No. 5, pp. 1388-1392, Sep. 1998.

Reindl et al., "SAW Devices as Wireless Passive Sensors," IEEE Ultrasonics Symposium, pp. 363-367, 1996.

Reindl, et al., "Theory and Application of Passive SAW Radio Transponders as Sensors," IEEE Transactions on Ultrasonics, Ferroelectrics, and Frequency Control, vol. 45, No. 5, pp. 1281-1292, Sep. 1998.

Reindl, "Wireless Passive SAW Identification Marks and Sensors," 2002 IEEE International Frequency Control Symposium and PDA Exhibition, New Orleans, LA, USA, 115 pp., May 29-31, 2002.

Schameli et al., "A UHF Near-Field RFID System with Fully Integrated Transponder," IEEE Transactions on Microwave Theory and Techniques, vol. 56, No. 5, pp. 1267-1277, May 2008.

Scherr et al., "Quartz Pressure Sensor Based on SAW Reflective Delay Line," IEEE Ultrasonics Symposium, pp. 347-350, 1996.

Schimetta et al., "Optimized Design and Fabrication of a Wireless Pressure and Temperature Sensor Unit Based on SAW Transponder Technology," IEEE MTT-S International Microwave Symposium Digest, pp. 355-358, 2001.

Scholl et al., "Wireless Passive SAW Sensor Systems for Industrial and Domestic Applications," IEEE International Frequency Control Symposium, pp. 595-601, 1998.

Tiersten, et al., "An Analysis of the Normal Acceleration Sensitivity of ST-Cut Quartz Surface Wave Resonators Rigidly Supported Along the Edges," 41st Annual Frequency Control Symposium, pp. 282-288, 1987.

* cited by examiner

US 8,384,524 B2

PASSIVE SURFACE ACOUSTIC WAVE SENSING SYSTEM

This Application claims priority to U.S. Provisional Application Ser. No. 61/118,390, entitled "SYSTEM OF PASSIVE SAW SENSORS FOR WIRELESS APPLICATIONS", filed Nov. 26, 2008, which is hereby incorporated by reference.

FIELD

The present disclosure relates generally to sensing and detection systems, and more particularly, to passive surface acoustic wave (SAW) based sensing and detections systems.

BACKGROUND

Many applications, such as automotive applications, industrial process control applications, security applications, building control applications, and medical applications, incorporate wireless sensors for monitoring various components and/or parameters. In the automotive industry, for example, wireless sensing is often used to monitor tire pressure in a tire pressure monitoring system (TPMS). In such systems, a pressure and/or temperature sensor may be mounted on a wheel rim or valve stem to sense pressure and/or temperature. Such sensors may wirelessly communicate with a central transceiver. In industrial process control applications, security applications, and building control applications, wireless sensing may allow, for example, increased network flexibility and reduced cost of wiring for installation. In medical and/or bio-medical applications, wireless sensors can be used for in vivo wireless sensing. These are just a few examples applications of wireless sensors.

Many wireless sensor systems can be relatively expensive to produce and use. For example, many wireless sensor systems require each sensor to include an on-board battery to power the sensor, an RFID tag or the like to positively identify the sensor, and/or other hardware. What would be desirable is a wireless sensing and/or detection system that is more cost effective to produce and use.

SUMMARY

The present disclosure relates generally to sensing and detection systems, and more particularly, to passive surface acoustic wave (SAW) based sensing and detections systems. In some cases, a plurality of passive (battery-less) wireless sensors are provided with each having a corresponding sensor coil. A reader may be provided for interrogating each of the plurality of wireless sensors. The reader may include a plurality of reader coils, where each of the reader coils may be positioned adjacent and inductively couple to a corresponding one of the sensor coils. A controller may sequentially activate the reader coils to sequentially interrogate each of the wireless sensors. In some cases, an RFID tag or the like is not required in each of the wireless sensors because the inductive coupling between the reader coils and the sensor coils may provide a one-to-one correspondence, and this may uniquely identify each of the wireless sensors.

In one illustrative embodiment, a detection system may include a plurality of sensors, where each of the plurality of sensors includes a surface acoustic wave device and a corresponding sensor coil. The sensor coil, when energized, is configured to energize and interrogate the corresponding surface acoustic wave device. A reader having a plurality of reader coils may also be provided. Each of the plurality of reader coils, when energized, may be configured to energize one of the sensor coils through inductively coupling, and interrogate the corresponding surface acoustic wave device. A controller may be coupled to the plurality of reader coils, wherein the controller may sequentially energize the plurality of reader coils to sequentially energize and interrogate each of the corresponding plurality of sensors. In some cases, the controller may include or have access to a memory that includes calibration coefficients for each of the plurality of sensors. The controller may apply the corresponding calibration coefficients after a particular wireless sensor is interrogated.

The preceding summary is provided to facilitate an understanding of some of the features of the present disclosure, and is not intended to be a full description. A full appreciation of the disclosure can be gained by taking the entire specification, claims, drawings, and abstract as a whole.

BRIEF DESCRIPTION

The disclosure may be more completely understood in consideration of the following description of various illustrative embodiments of the disclosure in connection with the accompanying drawings, in which.

DESCRIPTION

Figure 1:
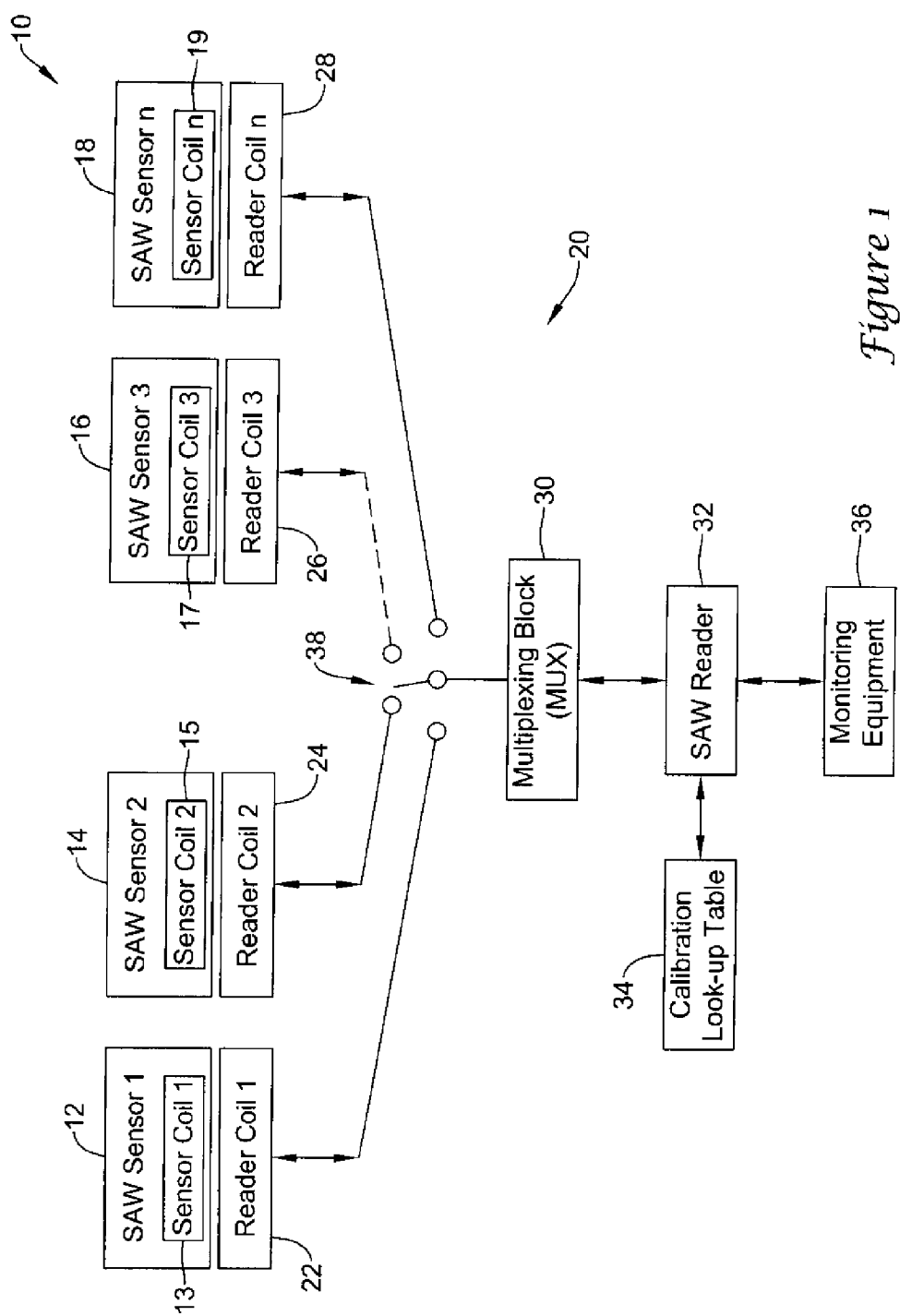
FIG. 1 is a schematic diagram of an illustrative Surface Acoustic Wave (SAW) based detection system employing inductive coupling Near Field Communication (NFC)

The following description should be read with reference to the drawings wherein like reference numerals indicate like elements throughout the several views. The description and drawings show several embodiments which are meant to be illustrative of the claimed disclosure.

FIG. 1 is a schematic diagram of an illustrative Surface Acoustic Wave (SAW) based detection system 10 employing inductive coupling near field communication (NFC). In the illustrative embodiment, the detection system 10 includes a plurality of passive (battery-less) SAW sensors 12, 14, 16, and 18, and an electronic reader 20 configured to interrogate the SAW sensors 12, 14, 16, and 18.

In the illustrative embodiment, the SAW sensors 12, 14, 16, and 18 may include, for example, chemical sensors, biological sensors, and/or physical sensors such as temperature sensors, pressure sensors, and/or flow sensors. It is contemplated, however, that any suitable sensor may be used, such as any suitable sensor for use in military applications, automotive applications, industrial applications, environmental applications, food industry applications, medical applications, and/or any other suitable applications as desired. The SAW sensors 12, 14, 16, and 18 may, in some cases, include one or more SAW devices including one or more interdigital transducers (IDTs) and reflectors disposed on a piezoelectric substrate to define a SAW resonator or a SAW delay line. The one or more IDTs may be configured to convert acoustic waves to electrical signals and vice versa by exploiting the piezoelectric effect of the substrate material.

In the illustrative embodiment, each of the SAW sensors 12, 14, 16, and 18 include an integrated sensor coil 13, 15, 17, and 19. The sensor coils 13, 15, 17, and 19 may be electrically connected to the IDTs of the SAW sensors 12 14, 16, and 18 via one or more traces, leads, or other electrical connections. When the sensor coils 13, 15, 17, and 10 are energized, one coil at a time (e.g. via a reader coil), the sensor coils 13, 15, 17, and 19 may provide an electrical current and/or voltage to the one or more IDTs of the corresponding SAW sensors 12, 14, 16, and 18 to provide power to the IDTs. In this example, the SAW sensors 12, 14, 16, and 18 may be passive (i.e. battery-less) sensors.

In the illustrative embodiment of FIG. 1, the detection system 10 may include an electronic reader 20 to sequentially interrogate each of the SAW sensors 12, 14, 16, and 18, by inductively coupling a reader coil to each of the sensor coils 13, 15, 17, and 19. As illustrated, the electronic reader 20 includes a plurality of reader coils 22, 24, 26, and 28 that are placed to inductively couple to corresponding ones of the sensor coils 13, 15, 17, and 19. The reader coils 22, 24, 26, and 28, and the sensor coils 13, 15, 17, and 19, may have a one-to-one correspondence, with each reader coil 22, 24, 26, and 28 inductively coupling to only one sensor coil 13, 15, 17, and 19, but this is not required.

As illustrated, there are "N" sensor coils 13, 15, 17, and 19, and "N" reader coils 22, 24, 26, and 28, where N may be 1, 2, 3, 4, 5, 6, 8, 10, 16 or any other integer, as desired. In the example shown, reader coil 1, shown as 22, may be positioned adjacent to sensor coil 1, shown as 13 such that reader coil 1 inductively couples only to sensor coil 1. Similarly, reader coil 2, shown as 24, may be positioned to inductively couple only to sensor coil 2, shown as 15. Reader coil 3, shown as 26, may be positioned to inductively couple sensor coil 3, shown as 17. Reader coil n, shown as 28, may be positioned to inductively couple sensor coil n, shown as 19.

In the illustrative embodiment, the electronic reader 20 may interrogate the SAW sensors 12, 14, 16, and 18 using inductively coupling Near Field Communication (NFC). In some cases, the inductive coupling near field communication may have a wireless communication range on the order of centimeters. For example, the wireless range of inductive coupling near field communication may be about twenty centimeters or less, about fifteen centimeters or less, about ten centimeters or less, about nine centimeters or less, about eight centimeters or less, about seven centimeters or less, about six centimeters or less, about five centimeters or less, about four centimeters or less, about three centimeters or less, about two centimeters or less, or any other distance, as desired. The wireless communication range of the inductive coupling near field communication may be based, at least in part, on the physical parameters of the reader coils 22, 24, 26, and 28 and/or sensor coils 13, 15, 17, and 19, as discussed in further detail in FIG. 3.

In the illustrative embodiment, each of the reader coils 22, 24, 26, and 28 may be arranged and positioned to have a relatively high mutual inductance with its corresponding sensor coils 13, 15, 17, and 19, and a relatively low mutual inductance with non-corresponding sensor coils 13, 15, 17, and 19. For example, reader coil 1 22 may be positioned and/or arranged to have a relatively high mutual inductance with sensor coil 1 13, and a relatively low mutual inductance, if any, with sensor coils 2 15, sensor coil 3 17, and sensor coil n 19, based at least in part on the limited wireless range mentioned above. In some cases, a spatial separation of the sensor coils 13, 15, 17, and 19 and reader coils 22, 24, 26, and 28 greater than an effective wireless range may reduce interference or noise caused by the mutual inductance of non-corresponding coils. For example, if the wireless range, or distance for a relatively high mutual inductance, of reader coil 1 22 is five centimeters, the other sensor coils 15, 17, and 19 may be spaced a distance further than five centimeters away from reader coil 1 22, such as, for example, ten centimeters or more. These example distances are merely illustrative and are not meant to be limiting. In some embodiments, positioning non-corresponding reader coils 22, 24, 26, and 28 and sensor coils 13, 15, 17, and 19 in an out of plane orientation, such as being offset or tilted, may help reduce the mutual inductance, or interference, of the coils.

In the illustrative embodiment, the electronic reader 20 may employ a multiplexer based time division interrogation technique using the inductive coupling based NFC of the sensors. To facilitate the multiplexer based time division interrogation, the electronic reader 20 may include a multiplexing block 30, a SAW reader block 32, and a calibration look-up table 34. The multiplexer block 30, SAW reader block 32 and/or calibration look-up table 34 may be part of a controller (e.g. a microcontroller or microprocessor). In some cases, the SAW reader 32 may control the interrogation of the SAW sensors 12, 14, 16, and 18 using the multiplexing block 30. The SAW reader 32 may also calibrate the sensor reading received from the SAW sensors 12, 14, 16, and 18 using calibration coefficients read from the calibration look-up table 34. In the illustrative embodiment, the calibration look-up table 34 may include calibration coefficients for each of the SAW sensor 12, 14, 16, and 18. In some cases, the calibration coefficients may be stored in a memory during installation of the detection system 10. However, it is contemplated that the calibration coefficients may be stored in the calibration look-up table 34 at the factory or in the field, as desired. While a calibration look-up table 34 is shown, it is contemplated that any suitable memory or storage may be used to store the calibration coefficients, as desired.

In the illustrative embodiment, the multiplexing block 30 may be electrically connected to each of the reader coils 22, 24, 26, and 28 via a switch 38. The switch 38 may be selectively switched by the multiplexer block 30 according to a signal received from the SAW reader 32. In some cases, the signal from the SAW reader 32 may include an electronic address indicating the reader coil 22, 24, 26, and 28 that the multiplexing block 30 should be connected to. For example, when the SAW reader 32 interrogates SAW sensor 1 12, the SAW reader 32 may send an address to the multiplexer block 30 indicating that SAW sensor 1 12 is to be interrogated. Using this address, multiplexer block 30 may move switch 38 to the position corresponding to SAW sensor 1 12 so that the multiplexer block 30 is electrically connected to reader coil 1 22. In some cases, the SAW reader 32 may use a digital address to control the switching of the multiplexer block 30. The digital address may also be used by the SAW reader 32 to recognize a return signal from multiplexer block 30, so that calibration coefficients that apply to the corresponding sensor may be applied to the received sensor data signal.

In one example, for a detection system 10 having sixteen SAW sensors, there may be sixteen reader coils. The reader coils may be selected using a four digit electronic address. For example, address 0001 may indicate that the multiplexer block 30 should select the first reader coil and only the first reader coil will be energized by the multiplexing block 30. While a switch 38 is shown, it is contemplated that other methods of connecting the multiplexing block 30 to the reader coils 22, 24, 26, and 28 may be used, as desired. For example, the multiplexing block 30 may include a number of outputs connected to each of the reader coils. In this instance, the multiplexing block 30 may selectively activate the output corresponding to the selected reader coil 22, 24, 26, and 28.

In the illustrative embodiment of FIG. 1, the multiplexer block 30 may send an electrical signal, such as a pulse or burst, to energize the selected reader coil 22, 24, 26, and 28. The selected reader coil 22, 24, 26, and 28 can then inductively couple the corresponding SAW sensor coil 13, 15, 17, and 19 to provide a voltage and/or current to SAW sensor 12, 14, 16, and 18. When energized, the SAW sensor 12, 14, 16, and 18 can detect a parameter, such as a pressure and/or a temperature. In the illustrative embodiment, the mutual inductance of corresponding reader coils 22, 24, 26, and 28 and sensor coils 13, 15, 17, and 19 may energize the one or more IDTs of the selected SAW sensor 12, 14, 16, and 18. In some embodiments, the selected SAW sensors 12, 14, 16, and 18 may have a resonant frequency that varies according to pressure and/or temperature variations. The one or more IDTs of the energized SAW sensor 12, 14, 16, and 18 may then send a return signal to the integrated sensor coil 13, 15, 17, and 19. In some cases, the return signal may include an indication of the sensed temperature, pressure, and/or other parameter.

The sensor coil 13, 15, 17, and 19 may then inductively couple to the corresponding reader coil 22, 24, 26, and 28 to return a signal including the sensor parameter or value. The multiplexing block 30 may then receive the signal from the selected reader coil 22, 24, 26, or 28, and forward the signal to the SAW reader 32. The SAW reader 32 may use the same address to retrieve the corresponding calibration coefficient (s) from the calibration look-up table 34. The retrieved calibration coefficient(s) may then be applied to the sensor parameter or value received from the selected sensor.

In the illustrative embodiment, interrogation of each of the SAW sensors 12, 14, 16, and 18 may be performed by applying a multiplexer based time division inductive coupling NFC with passive SAW sensors 12, 14, 16, and 18. In some cases, the interrogation of the SAW sensors 12, 14, 16, and 18 may be performed in a sequential or one at a time manner, as desired. In some cases, the interrogation may provide sufficient time for receiving a reply (e.g. sensor parameter or value) from the selected SAW sensor 12, 14, 16, and 18 before switching to a different SAW sensor 12, 14, 16, and 18. The positioning of the SAW sensors 12, 14, 16, and 18, and reader coils 22, 24, 26, and 28 may provide reduced interference or interference free communication. In some cases, no separate identification tag (e.g. RFID tag) may be needed for the identification of the SAW sensors 12, 14, 16, and 18.

In the illustrative embodiment, the SAW sensors 12, 14, 16, and 18 may be configured to operate at the same frequency or in the same frequency band. For example, the SAW sensors 12, 14, 16, and 18 may be configured to operate within the Industrial, Scientific, and Medical (ISM) radio band at, for example, about 434 megahertz. However, this frequency is merely illustrative and it is contemplated that other suitable frequencies may be used, as desired. In some cases, the multiplexer time based interrogation of the SAW sensors 12, 14, 16, and 18 by the SAW reader 32 may reduce the bandwidth needed to interrogate all of the SAW sensors 12, 14, 16, and 18. In some cases, the SAW sensors 12, 14, 16, and 18 may also be discriminated without the need for an identification tag (e.g. RFID tag).

In the illustrative embodiment, the SAW reader 32 may be in communication with monitoring equipment 36. In some cases, the SAW reader 32 may be connected to the monitoring equipment 36 via a wired or wireless connection. For example, in some cases, the SAW reader 32 may be selectively coupled to the monitoring equipment 36 via a suitable wireless protocol, such as Bluetooth, 802.11, cellular, or other suitable wireless protocol. It is contemplated that the monitoring equipment 36 may include a portable device, such as a personal computer, PDA, or other device, as desired.

In some embodiments, the electronic reader 20 may be provided in a fixed location relative to the SAW sensors 12, 14, 16, and 18 during use. In this embodiment, the electronic reader 20 may wirelessly communicate with a mobile device such as mobile monitoring equipment 36, as described earlier. In other embodiments, the electronic reader 20 may be a mobile device, which may be positioned adjacent to the SAW sensors 12, 14, 16, and 18 immediately before interrogation. For example, the electronic device 20 may be inserted into a housing or the like, held adjacent to the SAW sensors, or use any other suitable method or device to properly align the reader coils 22, 24, 26, and 28 of the electronic device 20 with the corresponding sensor coils 13, 15, 17, and 19 of the SAW sensors 12, 14, 16 and 18 to provide mutual inductance of the corresponding coils.

Figure 2:
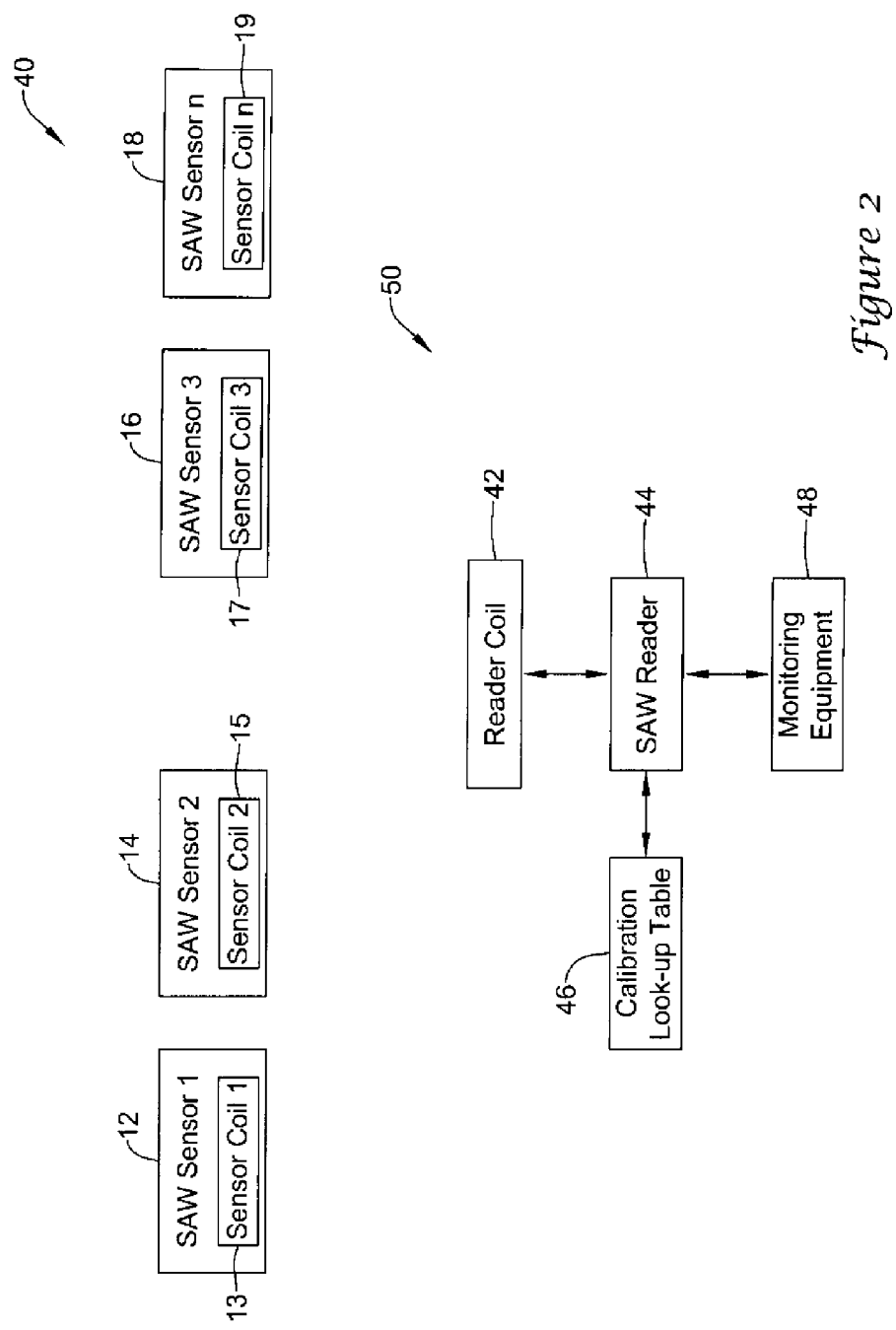
FIG. 2 is a schematic diagram of another illustrative Surface Acoustic Wave (SAW) based detection system.

FIG. 2 is a schematic diagram of another illustrative surface acoustic wave (SAW) based detection system 40. In the illustrative embodiment, the electronic reader 50 may be a portable or handheld device. In this instance, the electronic reader 50 may include one reader coil 42 that may be sequentially aligned with each of the sensor coils 13, 15, 17, and 19 of the multiple SAW sensors 12, 14, 16, and 18. In the illustrative embodiment, the electronic reader 50 may inductively couple to a single SAW sensor 12, 14, 16, and 18 at any given time, and may be moved to inductively couple to a different SAW sensor 12, 14, 16, and 18.

In the illustrative embodiment, to identify the SAW sensor 12, 14, 16, and 18 being interrogated by the electronic reader 50, a manual or automatic identification may be performed. For example, there may be a mark or other identification (e.g. bar code) on or adjacent to the SAW sensor 12, 14, 16, and 18 to be interrogated. In some cases, the operator can manually input the identification of the current SAW sensor 12, 14, 16, and 18 into the electronic reader 50 using a user interface (not shown). With the SAW sensor 12, 14, 16, and 18 to be interrogated identified, the electronic reader 50 may apply appropriate calibration coefficients to the sensor value read from the sensor.

In one embodiment, for automated identification or recognition by the electronic reader 50, the SAW sensors 12, 14, 16, and 18 may include a SAW delay line. Such a SAW delay line may have a number of metal reflectors located at varying distances from the IDTs for each SAW sensor 12, 14, 16, and 18. In some cases, the number of reflectors may determine the number of SAW sensors 12, 14, 16, and 18 that may be automatically identified by the electronic reader 50. For example, if "X" reflectors are provided, the electronic reader may be capable of recognizing $2^X$ sensors. The electronic reader 50 may use the return or echo signal from the reflectors of each of the SAW sensor 12, 14, 16, and 18 to identify or recognize the particular sensor and distinguish the particular sensor from the other sensors in the system. When the sensor is recognized, the SAW reader 50 may apply appropriate calibration coefficients to the sensor parameter or value. This, however, is just one example of automatic identification. It is contemplated that other ways of identifying the SAW sensor 12, 14, 16, and 18 may be used, such as for example, RFID tags. In some cases, the RFID tag may also include the calibration coefficients for the SAW sensor.

Figure 3:
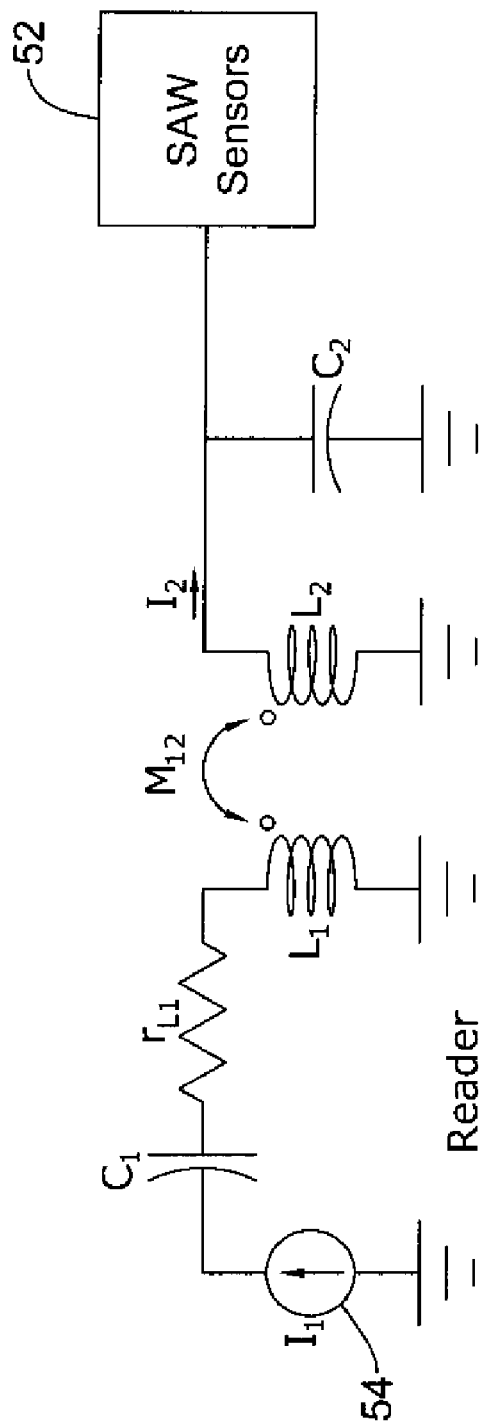
FIG. 3 is a schematic diagram of an equivalent model of a detection system.

FIG. 3 is a schematic diagram of an equivalent model of a detection system 10. As illustrated in the model, the reader is a transceiver (not explicitly shown), which may include an alternating current source 54 proving a current $I_1$. The current source 54 may be connected in series to a capacitor $C_1$, a resistor $r_{L1}$, and a coil $L_1$. The current $I_1$ and resistor $L_1$ may define a voltage $V_1$ of the reader.

As illustrated, the sensor side of the model may include a coil $L_2$ arranged to inductively couple coil $L_1$. The sensor side may also include a capacitor $C_2$ to form a shunt LC circuit. In some cases, the shunt LC circuit may be connected to a SAW device 52 including one or more IDTs and reflectors, as discussed above.

In the illustrative model, when a current $I_1$ is generated in a transmitter block (not shown) of the transceiver passes through coil $L_1$, a current $I_2$ may be induced (by inductive coupling) in the second coil $L_2$, which may have an amplitude that is proportional to current $I_1$. The LC shunt circuit may turn the current $I_2$ into a voltage that may be used to generate a voltage supply for the SAW sensor 52. When a parameter is sensed by the SAW sensor 52, the impedance load of the SAW sensor 52 may change, resulting in an amplitude and/or phase variation of the voltage of the reader coil $L_1$, and this will be detected by a receiver block (not shown) of the transceiver.

In the illustrative embodiment, the mutual inductance $M_{12}$ between the reader coil $L_1$ and the sensor coil $L_2$, which is given by Biot-Sevart Law, is:

$$M_{12} = \frac{\mu_0 \pi N_1 N_2 2 r_1^2 r_2^2}{2\sqrt{(d^2 + r_1^2)^3}},$$

where $N_1$ is the number of turns of the reader coil, $N_2$ is the number of turns of the sensor coil, $r_1$ is the radius of the reader coil, $r_2$ is the radius of the sensor coil, and d is the distance between the reader coil and the sensor coil.

The mutual inductance can be used to determine the maximum or optimal distances between the reader coils and the sensor coils to maximize the mutual inductance. The maximum mutual inductance can be found from the zero values of the first derivative of the mutual inductance equation in terms of $r_1$, which is:

$$r_1 = d\sqrt{2}.$$

This equation indicates an upper limit for the size of the reader coil in terms of the maximum coverage distance of the system. This equation can be used to position the reader coils and the sensor coils to reduce interference between non-corresponding coils. For example, sensor coils may be spaced a distance greater than the distance d corresponding to $r_1$ in order to reduce interference between adjacent coils. For example, if the reader coil has a radius of about 7 centimeters, the distance between the reader coil and sensor coil for a maximum mutual inductance is about 4.95 centimeters. In some embodiments, to reduce interference among multiple sensor coils, other sensor coils may be located about 10 centimeters or farther away from the sensor coil. This is just one example.

Figure 4:
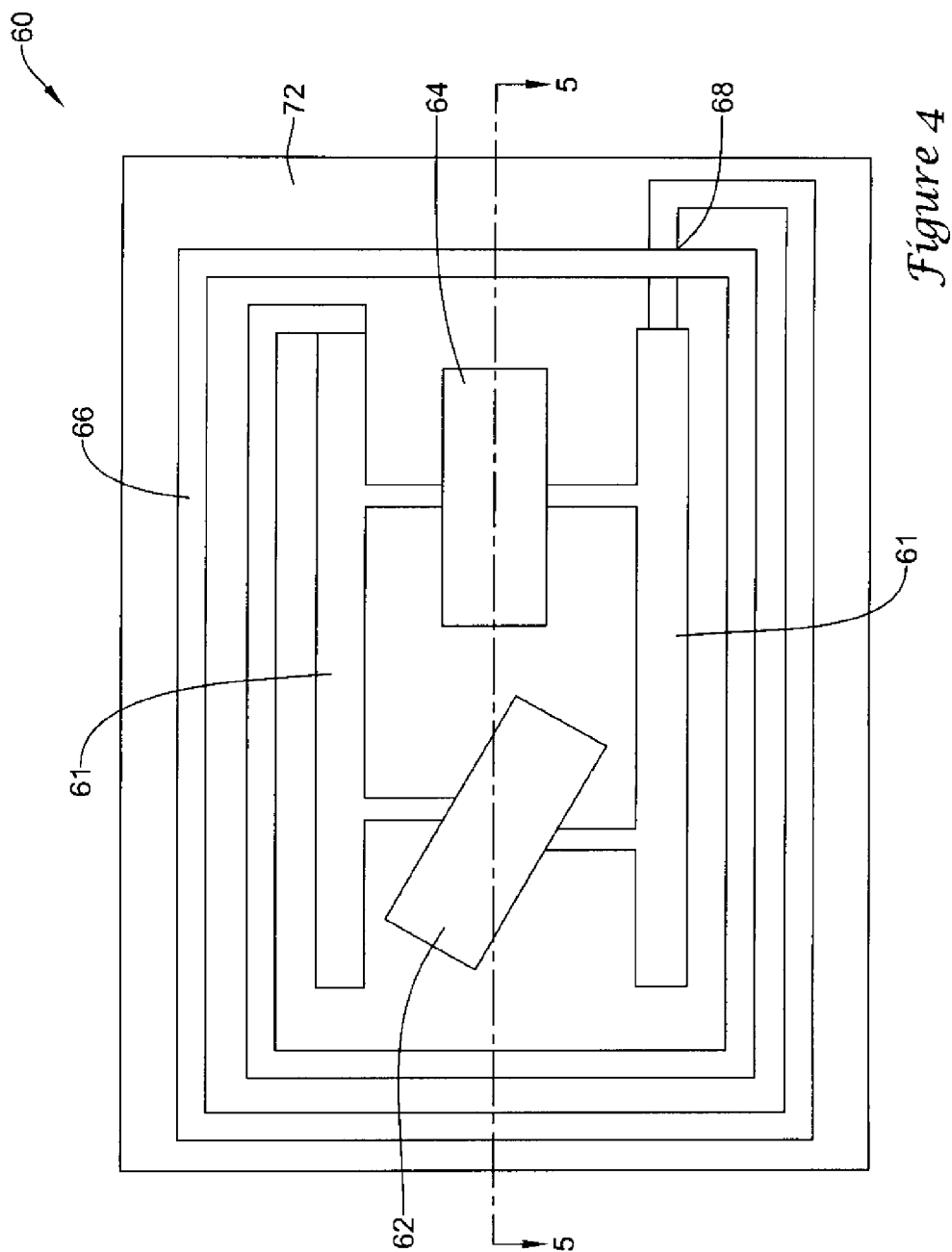
FIG. 4 is a top view of an illustrative SAW sensor that may be used in the detection systems of FIGS. 1 and 2.
Figure 5:
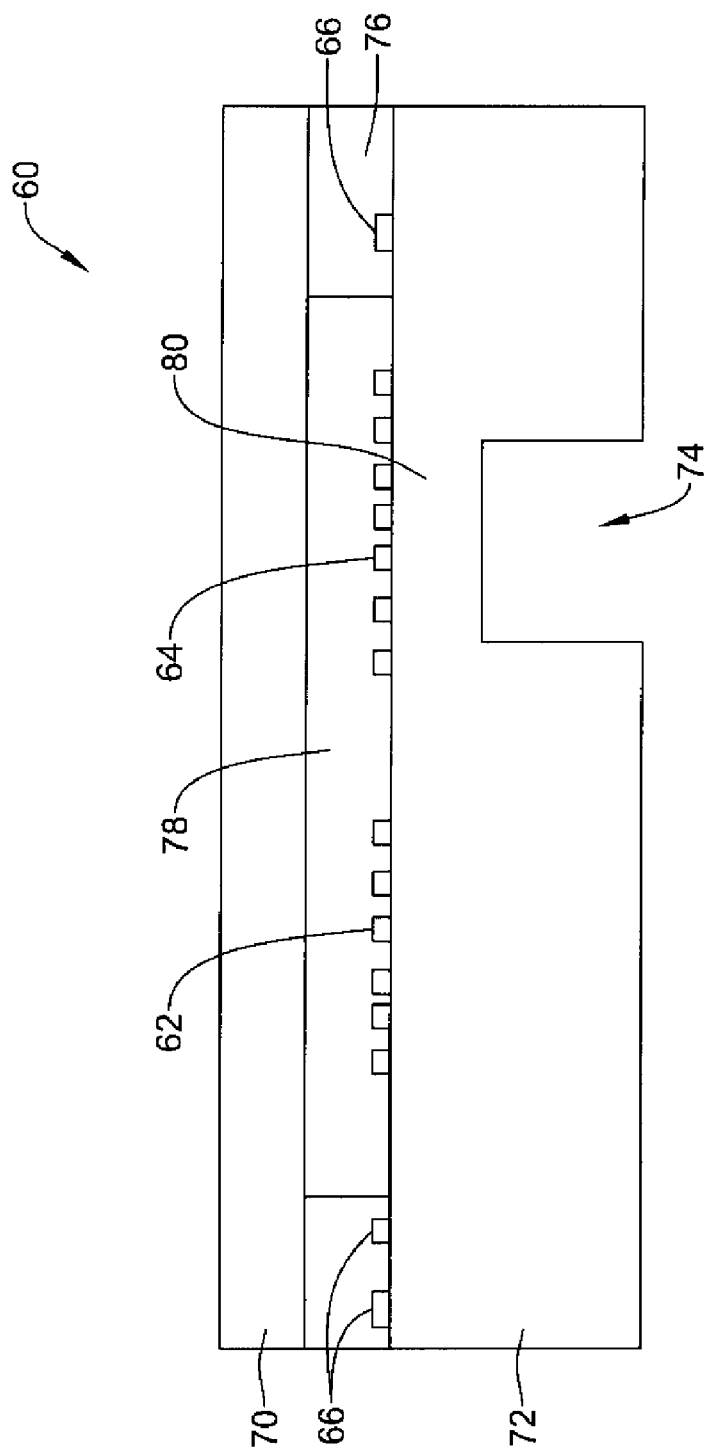
FIG. 5 is a cross-sectional view of the illustrative SAW sensor of FIG. 4, taken along line 5-5.

FIGS. 4 and 5 are a top view and a cross-sectional view, respectively, of an illustrative SAW sensor 60 that may be used in the detection systems 10 and 40 shown in FIGS. 1 and 2. In the illustrative diagram, the SAW sensor 60 may include one or more SAW sensing elements, and an integrated coil 66 disposed on a substrate 72. In the illustrative example, the one or more SAW sensing elements include a SAW temperature sensor 62 and a SAW pressure sensor 64. However, it is contemplated that other SAW sensing elements may be used, as desired. As illustrated, the SAW sensing elements 62 and 64 are integrated with the coil 66 on a single chip. However, it is contemplated that the SAW sensing elements 62 and 64 and the coil 66 may be disposed on separate chips, if desired.

In the illustrative embodiment, the substrate 72 may include a suitable piezoelectric material, such as, for example, quartz, lithium niobate, lithium tantalate, lanthanum gallium silicate, and/or any other suitable piezoelectric material, as desired. As shown in FIG. 5, the substrate 72 may include a back-side etch 74 to form a pressure sensing diaphragm 80 for the SAW pressure sensor 64.

As illustrated in FIG. 5, the sensor 60 may include a cover 70 and a glass frit 76. The glass frit 76 may bond the cover 70 to the substrate 72. In some cases, the cover 70 and glass frit 76 may define a chamber 78 for the SAW sensing elements 62 and 64. In some cases, chamber 78 may be sealed to a desired pressure for SAW pressure sensor 64. In other cases, it is contemplated that the cover 70 may include a port (not shown) for referencing a sensed pressure to another pressure or atmosphere, if desired. In some embodiments, the cover 70 may include a quartz material, however, it is contemplated that any suitable material may be used, as desired.

In the illustrative embodiment, the coil 66 may include one or more turns disposed on the substrate 72. In some cases, the coil 66 may be formed by suitable direct printing or other fabrication steps. The coil may include a suitable metal such as, for example, copper, silver, gold, or platinum. However, it is contemplated that other suitable materials may be used, depending on the application. At cross-over point 68 shown in FIG. 4, adjacent turns of the coil 66 may cross over one another. In some cases, a dielectric layer may be disposed between the adjacent turns to electrically isolate the turns. The dielectric layer may be silicon dioxide or other suitable dielectric material, as desired.

As shown in FIG. 5, the turns of the coil 66 may be provided between the glass fit 76 and the substrate 72. The coil 66 may be electrically connected to the SAW sensing elements 62 and 64 via one or more metal traces 61. The traces 61 may provide the electrical current from the coil 66 to the SAW devices 62 and 64.

Having thus described the preferred embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A sensing system comprising:
a plurality of surface acoustic wave based sensors, each of the surface acoustic wave based sensors including a sensor coil and a surface acoustic wave device, wherein each sensor coil, when energized, is configured to energize and interrogate the corresponding surface acoustic wave device to obtain a corresponding sensor value, wherein each sensor coil can be energized through inductively coupling;
an electronic reader including:
a plurality of reader coils, wherein when the electronic reader is aligned with the plurality of surface acoustic wave based sensors, each of the plurality of reader coils of the electronic reader is aligned with and inductively coupled to a corresponding one of the sensor coils of the plurality of surface acoustic wave based sensors;
a multiplexer coupled to the plurality of reader coils;
a memory;

a controller coupled to the multiplexer and the memory; wherein:

the controller is configured to control the multiplexer such that the multiplexer energizes only one of the plurality of reader coils at a given time to read the sensor value from the energized one of the plurality of surface acoustic wave based sensors; and the memory stores one or more calibration coefficients for each of the plurality of surface acoustic wave based sensors, the controller is configured to retrieve one or more of the calibration coefficients from the memory, and apply the calibration coefficients to the sensor values interrogated from the corresponding surface acoustic wave based sensors.

2. The sensing system of claim 1 wherein the controller sequentially interrogates the plurality of surface acoustic wave based sensors.

3. The sensing system of claim 2 wherein the controller sends the multiplexer an address to selectively energize one of the plurality of reader coils, waits for a sensor value to be interrogated from the corresponding surface acoustic wave based sensor, before selectively energizing another reader coil.

4. The sensing system of claim 3 wherein the controller applies one or more of the calibration coefficients to the sensor value.

5. The sensing system of claim 3 wherein the memory includes a look-up table storing the calibration coefficients, the calibration coefficients being selected using the address used for selectively energizing one of the plurality of reader coils.

6. The sensing system of claim 1 wherein the electronic reader is configured to wirelessly communicate with one or more mobile devices.

7. A detection system comprising:
a plurality of sensors, each of the plurality of sensors including a surface acoustic wave device and a corresponding sensor coil, wherein the sensor coil, when energized, is configured to energize and interrogate the corresponding surface acoustic wave device to obtain a sensor value;
a plurality of reader coils each aligned with one of the sensor coils of the plurality of sensors, each of the plurality of reader coils, when energized, is configured to energize the corresponding one of the sensor coils through inductively coupling, which energize and interrogate the corresponding surface acoustic wave device to obtain the corresponding sensor value; and
a controller coupled to the plurality of reader coils, wherein the controller is configured to sequentially energize the plurality of reader coils individually to sequentially energize and interrogate each of the corresponding plurality of sensors.

8. The detection system of claim 7, wherein the controller is configured to wait a period of time to receive a return signal from an energized reader coil before energizing a next reader coil.

9. The detection system of claim 7, wherein the controller includes a multiplexer to sequentially energize the plurality of reader coils.

10. The detection system of claim 9, wherein the controller provides an address to the multiplexer to select one of the reader coils and, when a reader coil is selected, the multiplexer sends an electrical signal to energize the selected reader coil, wherein the selected reader coil induces a current in a corresponding one of the sensor coils by inductively coupling.

11. The detection system of claim 10, wherein the current in the sensor coil provides power to the surface acoustic wave device.

12. The detection system of claim 10, wherein the controller includes a memory, the memory including a plurality of calibration coefficients each corresponding to one of the plurality of sensors, wherein each of the plurality of calibration coefficients is selected using the address provided to the multiplexer to select one of the reader coils.

13. The detection system of claim 12, wherein the memory includes a look-up table.

14. The detection system of claim 12, wherein the controller is configured to apply the calibration coefficients to values received by interrogating the plurality of sensors.

15. The detection system of claim 7, wherein each of the plurality of reader coils are configured to inductively couple with only one of the plurality of sensor coils.

16. The detection system of claim 7, wherein the controller is configured to wirelessly communicate with one or more mobile devices.

17. The detection system of claim 16, wherein the wireless communication is in accordance with a Bluetooth protocol.

18. A wireless detection system comprising:
a plurality of surface acoustic wave based sensors, each of the surface acoustic wave based sensors including a sensor coil and a surface acoustic wave device, wherein each sensor coil, when energized, is configured to energize and interrogate the corresponding surface acoustic wave device to obtain a corresponding sensor value;
an electronic reader including a plurality of reader coils and a controller, wherein each of the plurality of reader coils is configured to inductively couple to a corresponding one of the sensor coils; and
the controller is configured to sequentially activate the plurality of reader coils to sequentially interrogate the plurality of surface acoustic wave based sensors using time division interrogation.

19. The wireless detection system of claim 18, wherein the time division interrogation includes energizing a first reader coil of the plurality of reader coils using a multiplexer to inductively couple the first reader coil to a corresponding sensor coil.

20. The wireless detection system of claim 19, wherein the controller waits to receive a return signal from the first reader coil before energizing a second reader coil of the plurality of reader coils.

* * * * *